(12) United States Patent
Nagargadde et al.

(10) Patent No.: US 9,276,812 B1
(45) Date of Patent: Mar. 1, 2016

(54) AUTOMATED TESTING OF A DIRECT NETWORK-TO-NETWORK CONNECTION

(71) Applicant: Amazon Technologies, Inc., Seattle, WA (US)

(72) Inventors: Aparna Nagargadde, Herndon, VA (US); Mark Edward Stalzer, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 533 days.

(21) Appl. No.: 13/836,575

(22) Filed: Mar. 15, 2013

(51) Int. Cl.
*H04L 12/24* (2006.01)
*G06F 11/30* (2006.01)

(52) U.S. Cl.
CPC ........ *H04L 41/0806* (2013.01); *G06F 11/3006* (2013.01)

(58) Field of Classification Search
CPC ................. H04L 41/0806; G06F 11/3006
USPC .................................................. 709/223–224
See application file for complete search history.

(56) References Cited

U.S. PATENT DOCUMENTS

2009/0271352 A1* 10/2009 Gentry ............... H04L 12/2697 706/47
2013/0272146 A1* 10/2013 Jones ..................... H04L 43/50 370/252
2014/0119221 A1* 5/2014 Park .................... H04L 41/5038 370/252

OTHER PUBLICATIONS

Web Article: "AWS Direct Connect" [online][retrieved on Feb. 6, 2013] retrieved from: http://aws.amazon.com/directconnect/ 5 pps.
Web Article: "AWS Direct Connect FAQs" [online][retrieved on Feb. 6, 2013] retrieved from: http://aws.amazon.com/directconnect/faqs/#G1 5 pps.
Wikipedia Article: "Virtual Private Cloud" [online][retrieved on Feb. 6, 2013] retrieved from: http://en.wikipedia.org/wiki/Virtual_private_cloud 2 pps.
Wikipedia Article: "Virtual LAN" [online][retrieved on Feb. 6, 2013] retrieved from: http://en.wikipedia.org/wiki/Virtual_LAN 8 pps.

* cited by examiner

*Primary Examiner* — Chris Parry
*Assistant Examiner* — Weiwei Stiltner
(74) *Attorney, Agent, or Firm* — Lee & Hayes, PLLC

(57) ABSTRACT

A direct network connection is established between a customer network and a service provider network. Computing resources are then provisioned in the service provider network in an automated fashion. The network connection between the service provider network and the customer network is also configured such that data can be transmitted from one of the computing resources to another one of the computing resources by way of at least a portion of the customer network. Test data is then transmitted from one computing resource to another computing resource by way of at least a portion of the customer network. One or more test results are then generated based upon characteristics of the transmission of the test data from one resource to the other resource by way of the customer network. The resources may be de-provisioned in an automated fashion following completion of the testing.

20 Claims, 9 Drawing Sheets

US 9,276,812 B1

AUTOMATED TESTING OF A DIRECT NETWORK-TO-NETWORK CONNECTION

BACKGROUND

Network-based service providers exist that allow customers to purchase and utilize computing resources, such as virtual machine instances, on a permanent or as-needed basis. In addition to virtual machine instances, these types of services typically allow customers to purchase and utilize other types of computing resources. For example, customers might be permitted to purchase access to and use of block data storage services, database services, networking resources, and other types of computing resources. Utilizing these computing resources as building blocks, customers of such a service can create custom "solutions" that provide various types of functionality, such as application hosting, backup and storage, content delivery, World Wide Web ("Web") hosting, enterprise information technology ("IT") solutions, database services, and others.

In order establish private, dedicated connectivity between a customer network and a service provider network providing computing resources such as those described above, a direct network-to-network connection might be established between the customer network and the service provider network. Utilizing such a direct network-to-network connection between the customer network and the service provider network might provide various benefits to the customer including, but not limited to, reducing bandwidth costs by lowering the amount of data transmitted over the Internet, providing consistent network performance, and providing private connectivity to computing resources within the service provider network.

It can sometimes be challenging, however, to test the connectivity and performance of a direct network-to-network connection between a customer network and a service provider network. This challenge often stems from the fact that the individuals provisioning the direct network-to-network connection (e.g. individuals at a telecommunications company) are not the same individuals that will configure and utilize the computing resources provided by the service provider. The individuals provisioning the connection, therefore, might be unfamiliar with the configuration and use of the computing resources provided by the service provider. Moreover, testing the connectivity and performance of a direct network-to-network connection between a customer network and a service provider network often requires that trained individuals be present at both sides of the connection (i.e. one individual located at the customer premises and one individual located at the service provider premises). Having trained individuals at both sides of a network connection is not, however, always practical or economical.

The disclosure made herein is presented with respect to these and other considerations.

DETAILED DESCRIPTION

Figure 1A:
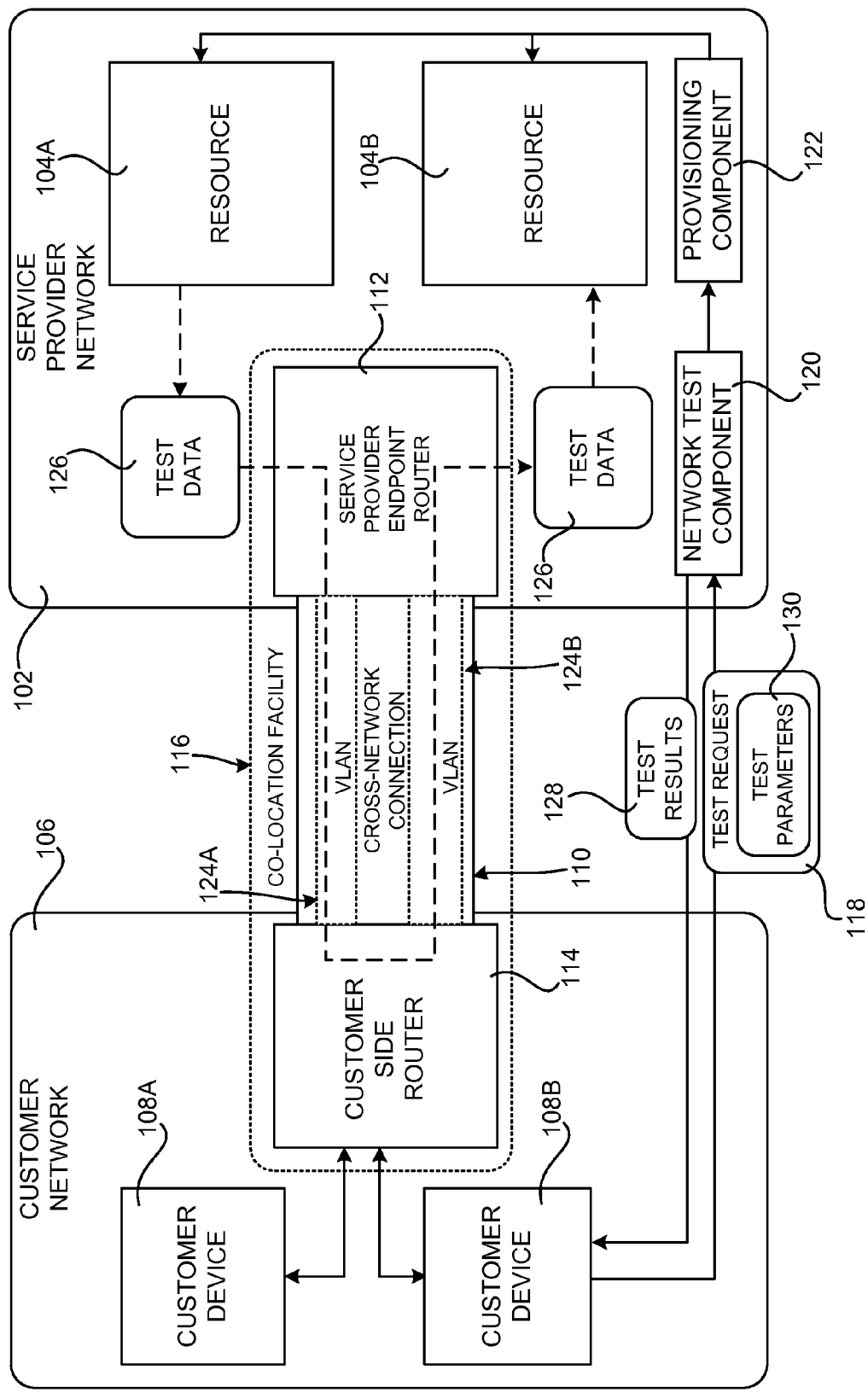
FIGS. 1A and 1B are network architecture diagrams showing aspects of one illustrative mechanism described herein for testing a direct network-to-network connection using resources provided by a service provider network.
Figure 1B:
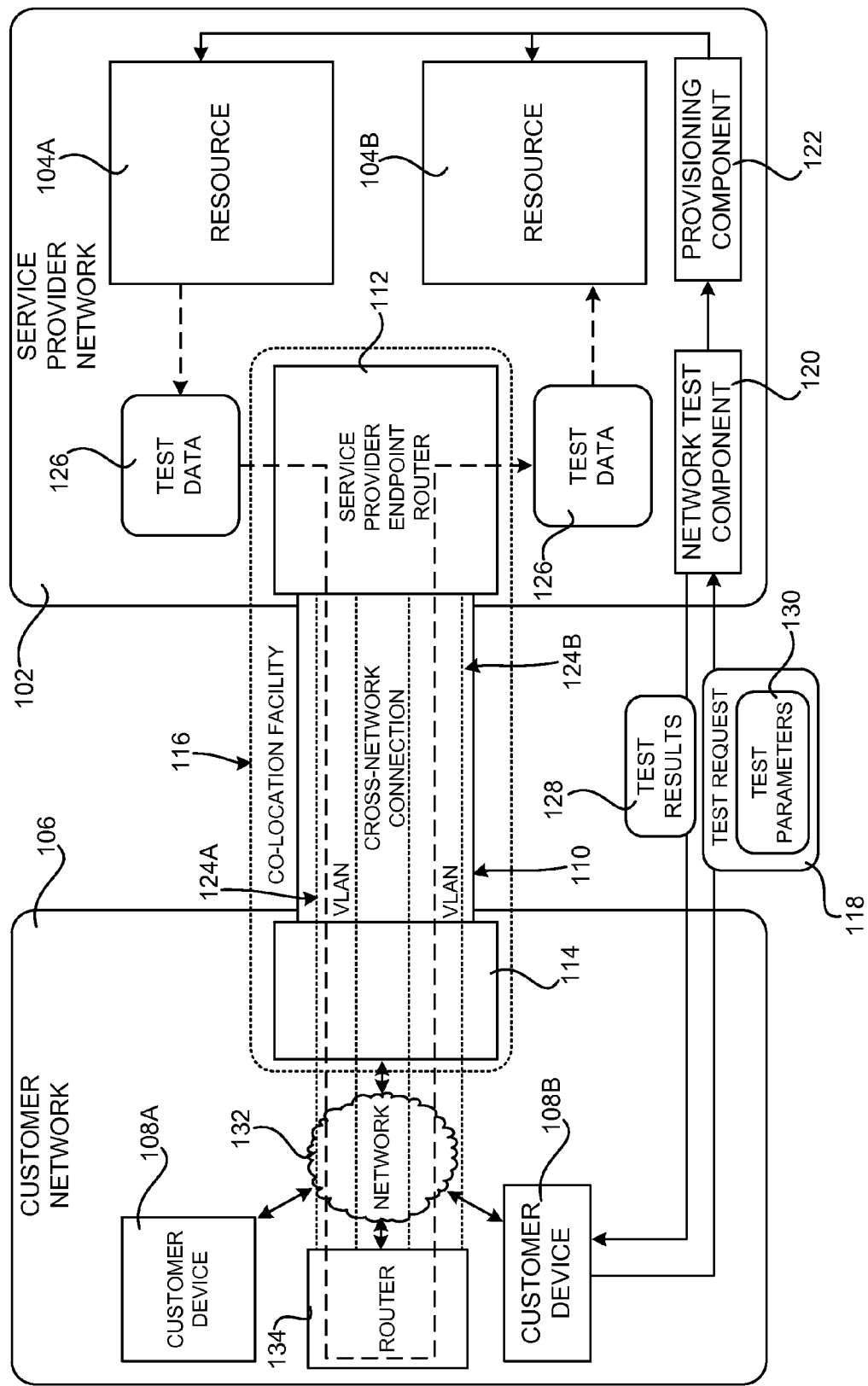

The following detailed description is directed to technologies for automated testing of a network-to-network connection. Utilizing the technologies described herein, a customer of a service provider can test the connectivity and performance of a direct network-to-network connection between a customer network and a service provider network in an automated fashion, and without the requirement discussed above that service personnel be present on the service provider side of the direct network-to network connection. Moreover, in addition to testing the direct network-to-network connection, a customer can also utilize aspects of the functionality described herein to test connectivity and performance of various portions of network connection between the service provider network and the customer network.

According to one aspect presented herein, a computer-implemented mechanism is disclosed for testing a direct network-to-network connection between a customer network and a service provider network. In particular, portions of a network connection between a customer network and a service provider network can be tested by first provisioning a first computing resource and a second computing resource in the service provider network. The first and second resources might be virtual machine instances or other types of computing resources that are located in virtual private clouds ("VPCs") in the service provider network, for example. The first and second resources might also be other types of computing resources located within or outside of VPCs, such as publically accessible computing resources like data storage resources or database resources. Other types of resources might also be utilized. The first and second resources can be provisioned in the service provider network in an automated fashion and without human interaction.

The network connection between the customer network and the service provider network is then configured such that data can be transmitted from the first resource to the second resource by way of at least a portion of the customer network. To accomplish this, virtual local area networks ("VLANs") may be provisioned between an endpoint router in the service provider network and a customer side router in the customer network. For example, one VLAN might be provisioned on the network connection for use in transmitting test data from the first resource within the service provider network to the customer network. Another VLAN might also be provisioned on the network connection for use in transmitting test data from the customer network to the second resource within the service provider network. The VLANs can be provisioned in an automated fashion and without human interaction. The customer router might also be configured to route network traffic received on one of the VLANs onto the other VLAN.

In order to perform a test of the connection between the service provider network and the customer network, test data is transmitted from the first resource in the service provider network, out the endpoint router, and over the first VLAN to the customer side router. The test data might be a request to write data from the first resource to the second resource, for example. Alternately, the test data might be a request to read data from the second resource. Other types of test data might also be utilized.

The customer side router then forwards the received traffic out the second VLAN to the second resource in the service provider network. One or more test results, such as test results describing the connectivity and/or performance of the connection between the customer network and the service provider network, may then be generated based upon the characteristics of the transmission of the test data from the first resource to the second resource in the service provider network by way of the customer network. Once the testing has been completed, the resources in the service provider network and the VLANs may be de-provisioned in an automated fashion and without human intervention. Additional details regarding the various components and processes described above for automated testing of a network-to-network connection between a customer network and a service provider network will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1A is a network architecture diagram showing aspects of one illustrative mechanism described herein for testing a direct network-to-network connection 110 using resources 104 on a service provider network 102. As described briefly above, the various mechanisms disclosed herein might operate in conjunction with a network-based distributed computing environment in which customers can purchase and utilize computing resources 104A-104B (which may be referred to herein generally as a "resource 104" or "resources 104," or specifically as a "resource 104A" or a "resource 104B"), such as virtual machine instances or other resources, from a service provider on a permanent or as-needed basis. Each type or configuration of a resource 104 may be available from the service provider in different sizes, such as large resources, consisting of many processors, large amounts of memory, and/or large storage capacity, and small resources consisting of fewer processors, smaller amounts of memory, and/or smaller storage capacity. For example, the service provider might offer virtual machine instances available for purchase and use that have many different configurations of processor capabilities, main memory, disk storage, and operating system.

The service provider might also offer other types of resources 104 for purchase and use by customers. For example, the service provider might offer load balancing resources, domain name service ("DNS") resources, VPC resources, VLAN resources, data storage resources, networking resources, database resources, and other types of resources on a permanent or as needed basis. The service provider may charge a fee for operating the resources 104 to the customer that creates and uses the resources 104. The service provider might utilize various pricing models to charge a customer for use of resources 104 provided by the service provider. Utilizing the resources 104 as building blocks, customers of such a service provider can create custom "solutions" that provide various types of functionality, such as application hosting, backup and storage, content delivery, Web hosting, enterprise IT solutions, database services, and others.

The resources 104 described above may be provided in one particular implementation by one or more data centers (not shown in FIG. 1) operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as the co-location facility 116, and various networks, such as the Internet. In the environment shown in FIG. 1A, a service provider might operate one or more data centers configured to provide the resources 104 described herein to its customers and other users.

The various resources 104 described above might also be provisioned and de-provisioned as needed in an automated fashion. For example, a customer might submit a request to the service provider network 102 to instantiate a new instance of a virtual machine. In response to receiving such a request, a provisioning component 122, or one or more other components within the service provider network 102, might create the new instance of the virtual machine as requested by the customer. The customer may then be permitted to utilize the new instance of the virtual machine as desired. When the customer has finished using the virtual machine instance, the customer may request that the virtual machine instance be de-provisioned. In response thereto, the provisioning component 122, or another component in the service provider network 102, may cause the virtual machine instance to be de-provisioned. Other resources 104 might also be provisioned and de-provisioned in a similar manner. The service provider network 102 might also provide functionality for automatically scaling and/or de-scaling resources 104 based upon demand for the resources 104 or other factors.

In some implementations, some or all of the resources 104 associated with a particular customer are configured for private use. For example, some resources 104, such as virtual machine instances, might be created in a virtual private cloud ("VPC") associated with the customer. In some implementations, the service provider network 102 also provides resources 104 that are publically accessible. For example, the service provider network 102 might allow the use of virtual machine instances, storage resources, database resources, and other types of resources that are directly accessible by way of a public network, such as the Internet. The service provider network 102 might also provide other types of resources that are accessible in other ways not specifically mentioned herein.

A service provider might also enable access to the purchased resources 104 by way of a network, referred to herein as the "service provider network 102." The customers and other consumers of the service provider may access the resources 104 on the service provider network 102 over various types of network connections, such as one or more wide area networks ("WANs") like the Internet. For example, customer devices 108A and 108B located on a network operated by a customer of the service provider (referred to herein as the "customer network 106") might access the resources 104 by way of the Internet or other types of network connections, some of which will be described below.

Other types of networking technologies and topologies known in the art might also be utilized to connect the computing resources 104 to remote customers and other users. It should be appreciated that combinations of such networks might also be utilized. In this regard, it should be further appreciated that the network topology illustrated in FIG. 1A, and the other FIGS., has been greatly simplified for discussion purposes. Many other computing systems, networking components, network connections, software components, and other types of components might be utilized than have been illustrated in FIG. 1A, and the other FIGS., and described herein.

As discussed briefly above, in order establish private, dedicated connectivity between the customer network 106 and the service provider network 102, a direct network-to-network connection 110 might be established between the customer network 106 and the service provider network 102. For example, certain telecommunications providers operate co-location facilities 116 that permit for a cross-network connection between a service provider endpoint router 112, owned and operated by the service provider, and a customer side router 114, owned and operated by a customer. In some implementations, the service provider endpoint router 112 and the customer side router 114 are physically located in the same co-location facility 116. In these implementations, the cross-network connection can be made directly between a port on the service provider endpoint router 112 and a port on the customer side router 114. Other implementations might also be utilized.

Utilizing a direct network-to-network connection 110 between a customer network 106 and a service provider network 102, such as that described above, might provide various benefits to the customer including, but not limited to, reducing bandwidth costs by lowering the amount of data transmitted over the Internet, providing consistent network performance, and providing private connectivity to computing resources within the service provider network. The customer of the service provider might also realize other benefits not specifically mentioned herein through the use of the direct network-to-network connection 110.

As also mentioned above, it can sometimes be challenging to test the connectivity and performance of a direct network-to-network connection 110 between a customer network 106 and a service provider network 102, such as that described above. This challenge often stems from the fact that the individuals provisioning the direct network-to-network connection 110 (e.g. individuals at a telecommunications company) are not the same individuals that will configure and utilize the resources 104 available through the service provider network 102. The individuals provisioning the direct network-to-network connection 110, therefore, might be unfamiliar with the configuration and use of the resources 104 provided by the service provider. Moreover, testing the connectivity and performance of the direct network-to-network connection 110 between a customer network 106 and a service provider network 102 often requires that trained individuals be present at both sides of the connection (i.e. one individual located on the premises of the customer network 106 and another individual located on the premises of the service provider network 102). Having trained individuals at both sides of a network connection is not, however, always practical or economical. The various mechanisms disclosed herein might address these, and potentially other, challenges of testing a direct network-to-network connection 110, such as that described above.

In order to test the availability and performance of the direct network-to-network connection 110, a network test component 120 is provided in one embodiment disclosed herein. The network test component 120 might be implemented as hardware, as software, or as a combination of hardware and software. The network test component 120 is configured to receive a test request 118 from an authorized customer representative, from an administrator of the service provider network 102, or from another authorized individual. Test parameters 130 might also be specified with the test request 118 that define aspects of the manner in which the test of the direct network-to-network connection 110 is to be performed.

The network test component 120 might provide an appropriate user interface, such as a Web page, through which a user can submit the test request 118 and the test parameters 130. In other embodiments, the network test component 120 might provide an application programming interface ("API") through which the test request 118 and the test parameters 130 can be submitted. Other types of interfaces for submitting a test request 118 and/or test parameters 130 might also be provided. Additional details regarding the various test parameters 130 that might be received and utilized to test the direct network-to-network connection 110 will be provided below with regard to FIG. 5.

In response to receiving a test request 118 and the test parameters 130, the network test component 120 is configured to provision resources 104A and 104B for use in testing the direct network-to-network connection 110. For example, in one particular implementation, illustrated in FIG. 2, the network test component 120 might utilize the provisioning component 122, or one or more other components within the service provider network 102, to provision a VPC 204A that includes one or more virtual machine instances 202A for use in testing the direct network-to-network connection 110.

The network test component 120 might also utilize the provisioning component 122, or one or more other components within the service provider network 102, to provision a second VPC 204B that includes one or more other virtual machine instances 202B, also for use in testing the direct network-to-network connection 110. As will be discussed in greater detail below, the virtual machine instance 202A in the VPC 204A may be configured to transmit test data 126 to the virtual machine instance 202B in the VPC 204B to test aspects of the operation of the direct network-to-network connection 110. The test data 126 is routed through at least a portion of the customer network 106. Additional details regarding this process will be described below.

Figure 3:
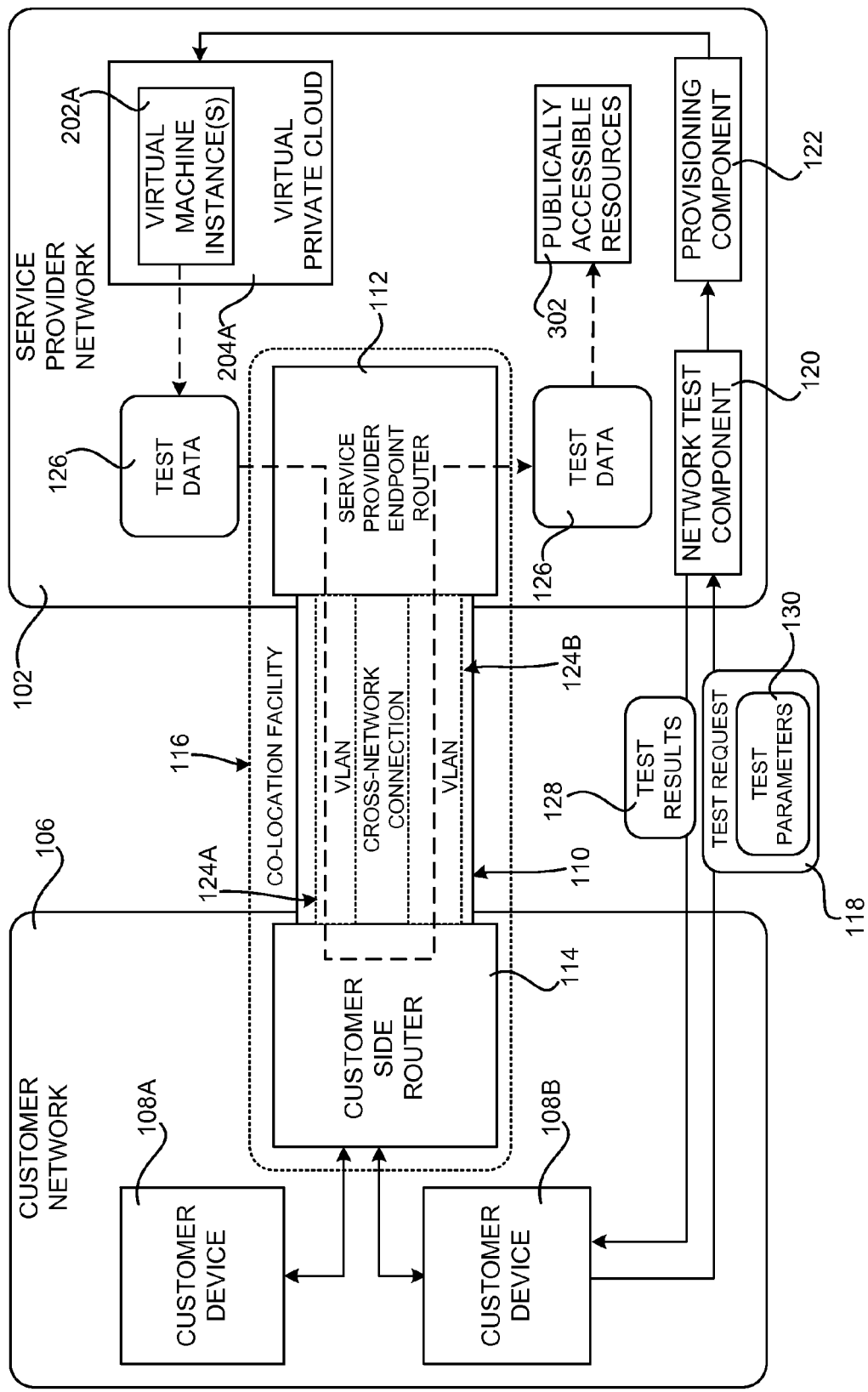
FIG. 3 is a network architecture diagram showing aspects of one illustrative mechanism described herein for testing a direct network-to-network connection using virtual machine instances in a virtual private cloud and publically accessible resources provided by a service provider network.

In another implementation, illustrated in FIG. 3, the network test component 120 might utilize the provisioning component 122, or one or more other components within the service provider network 102, to provision a VPC 204A that includes one or more virtual machine instances 202A for use in testing the direct network-to-network connection 110. In this example, the virtual machine instance 202A may be configured to transmit test data 126 to one or more publically accessible resources 302 in the service provider network 102 to test aspects of the operation of the direct network-to-network connection 110.

Figure 2:
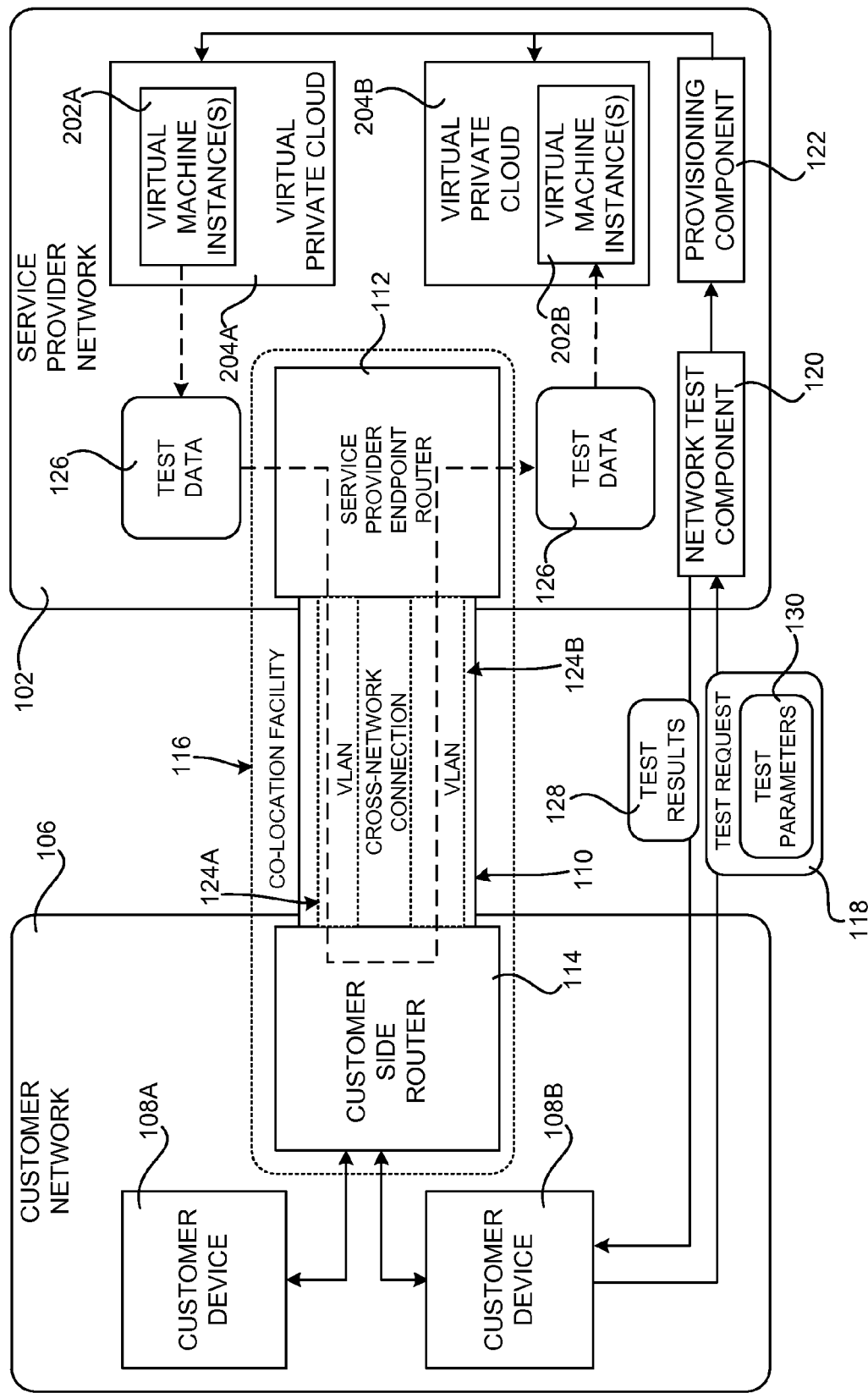
FIG. 2 is a network architecture diagram showing aspects of one illustrative mechanism described herein for testing a direct network-to-network connection using virtual machine instances in virtual private clouds provided by a service provider network.

For example, the virtual machine instance 202A shown in FIG. 3 might be configured to transmit read or write requests to a publically available data storage resource or a database resource in the service provider network 102. The test data 126 is routed through at least a portion of the customer network 106. Additional details regarding this process will be described below. It should be appreciated that the various configurations shown in FIGS. 2 and 3 are merely illustrative and that other types of resources 104 might be utilized to generate test data 126 for testing the direct network-to-network connection 110 in the manner disclosed herein.

In order to cause the test data 126 to be routed through at least a portion of the customer network 106, the network test component 120 is also configured to provision VLANs 124A and 124B between the service provider endpoint router 112 in the service provider network 102 and the customer side router 114 in the customer network 106. For example, one VLAN 124A might be provisioned for use in transmitting the test data 126 from the first resource 104A within the service provider network 102, such as the virtual machine instance 202A, to the customer side router 114 on the customer network 106.

A second VLAN 124B might also be provisioned on the direct network-to-network connection 110 for use in transmitting the test data 126 from the customer side router 114, through the service provider endpoint router 112, and ultimately to the second resource 104B, such as the virtual machine instance 202B or the publically accessible resources 302, within the service provider network 102. Through the use of the provisioning component 122, or one or more other components operating in the service provider network 102, the VLANs 124A and 124B can be provisioned in an automated fashion and without human interaction. The customer side router 114 might also be configured to route network traffic received on the VLAN 124A, such as the test data 126, onto the VLAN 124B.

In order to perform a test of the direct network-to-network connection 110 between the service provider network 102 and the customer network 106, the resource 104A transmits the test data 126 to the resource 104B. The test data 126 is routed through the service provider endpoint router 112 and over the VLAN 124A to the customer side router 114. For example, the test data 126 might be a request to write data from the resource 104A to the resource 104B. Alternately, the test data 126 might be a request to read data from the resource 104B. Other types of test data might also be utilized. The customer side router 114 then forwards the test data 126 onto the second VLAN 124B to the service provider endpoint router 112. The service provider endpoint router 112 and, potentially other components in the service provider network 102, then cause the test data 126 to be routed to the resource 104B.

Once the testing of the direct network-to-network connection 110 described has been completed, one or more test results 128, such as metrics describing the connectivity or performance of the direct network-to-network connection 110 between the customer network 106 and the service provider network 102, may then be generated based upon the characteristics of the transmission of the test data 126 from the resource 104A to the resource 104B. For example, the test results 128 might include metrics including, but not limited to, whether the test described above was successful or unsuccessful, the throughput and/or latency of the direct network-to-network connection 110, and/or any other type of metric that describes the availability and/or performance of a network link. The test results 128 might then be provided to the individual that submitted the test request 118, such as a customer representative or an administrator of the service provider network 102.

Once the testing process described above has been completed, the resources 104A and 104B in the service provider network 102 and the VLANs 124A and 124B may be de-provisioned in an automated fashion and without human intervention. For example, the network test component 120 might instruct the provisioning component 122, or one or more other components in the service provider network 102, to de-provision the resources 104A and 104B and the VLANs 124A and 124B. Additional details regarding the various components and processes described above for automated testing of the direct network-to-network connection 110 between the customer network 106 and the service provider network 102 will be presented below with regard to FIGS. 4-7.

As discussed above, the VLANs 124 may be provisioned on the direct network-to-network connection 110 between the service provider endpoint router 112 and the customer side router 124A in one embodiment. It should be appreciated, however, that the VLANs 124A and 124B might be provisioned between the service provider endpoint router 112 and virtually any router within the customer network 106. For instance, in the example shown in FIG. 1B, the VLANs 124 have been provisioned between the service provider endpoint router 112 and a router 134 connected to a network 132. In this way, the test data 126 can be routed from the resource 104A, through the VLAN 124A to the router 134, and then back to the resource 104B through the VLAN 124B. By performing tests using VLANs 124A and 124B configured between the service provider endpoint router 112 and different routers at different locations within the customer network 106, such as the router 134, different aspects of the network connection between the service provider network 102 and the customer network 106 might be tested.

Figure 4A:
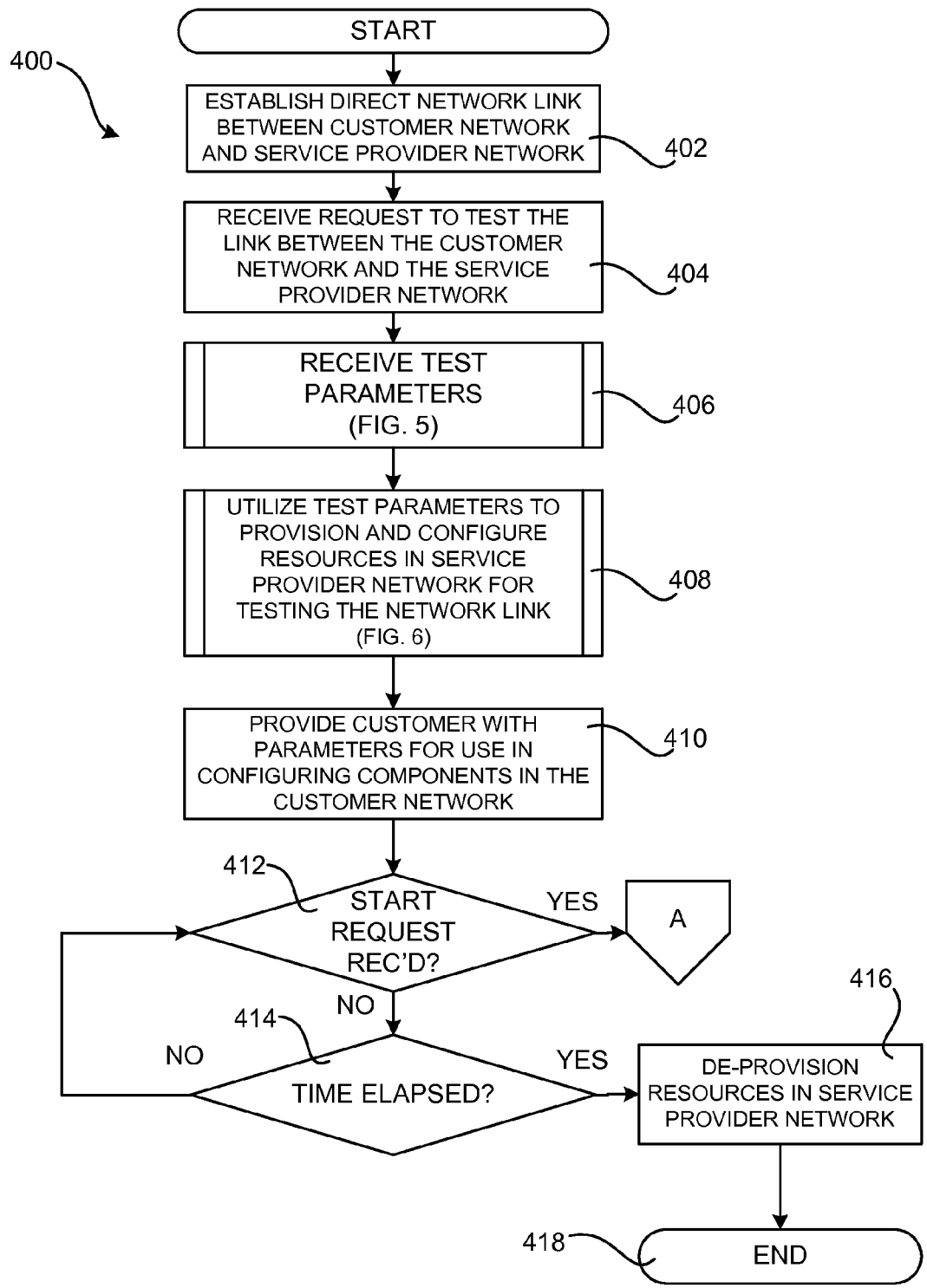
FIGS. 4A and 4B are flow diagrams showing one illustrative routine for testing a direct network-to-network connection using resources provided by a service provider network.
Figure 4B:
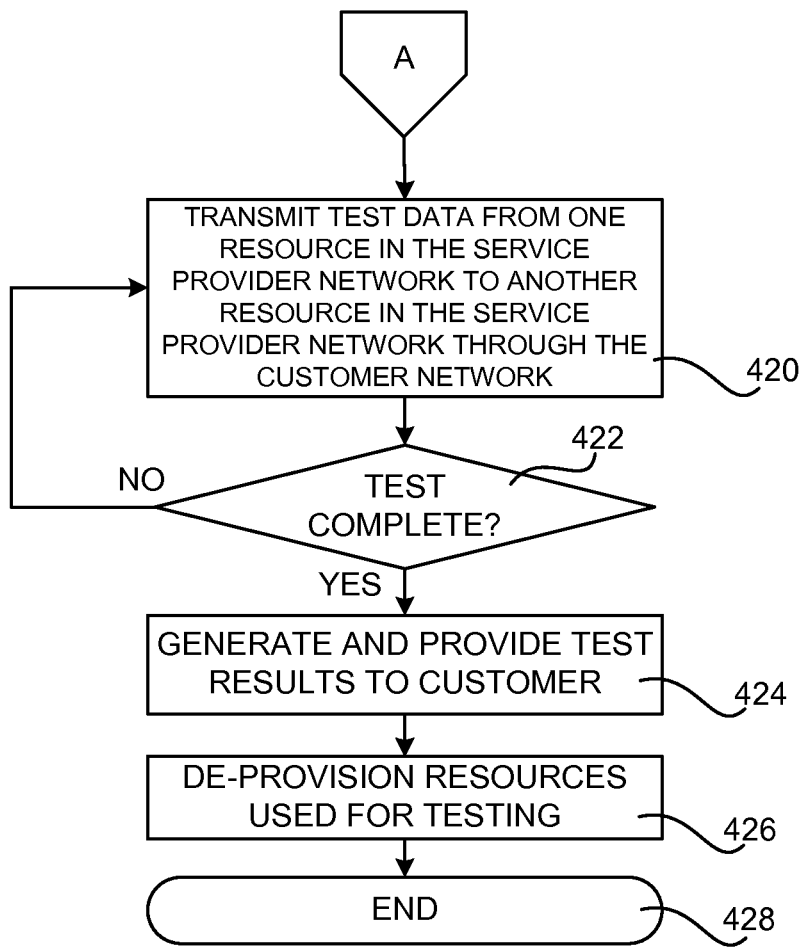

FIGS. 4A and 4B are flow diagrams showing one illustrative routine 400 for testing the direct network-to-network connection 110 using resources 104 provided by the service provider network 102. It should be appreciated that the logical operations described herein with respect to FIGS. 4A and 4B, and the other FIGS., may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 400 begins at operation 402, where a direct network-to-network connection 110 is established between the customer network 106 and the service provider network 102. As described above, for instance, a cross-network connection might be established between a service provider endpoint router 112, owned and operated by the service provider, and a customer side router 114, owned and operated by a customer of the service provider. Other types of direct network-to-network connections might also be utilized.

From operation 402, the routine 400 proceeds to operation 404, where a request to test the operation of the direct network-to-network connection 110 is received at the network test component 120. As mentioned above, the test request 118 might be submitted by way of an appropriate GUI, through an API, or in another manner. As also mentioned above, the test request 118 might also include one or more test parameters 130 describing how the test of the direct network-to-network connection 110 should be performed. This occurs at operation 406. One illustrative routine for receiving test parameters 130 will be described below with regard to FIG. 5.

From operation 406, the routine 400 proceeds to operation 408, where the test parameters 130 are utilized to provision and configure various resources 104 in the service provider network 102 for use in testing the direct network-to-network connection 110. For example, the test parameters 130 may be utilized to provision and configure the VPCs 204A and 204B and the virtual machine instances 202A and 202B. Additional details regarding the provisioning and configuration of resources 104 for use in testing the direct network-to-network connection 110 will be provided below with regard to FIG. 6.

From operation 408, the routine 400 proceeds to operation 410, where a customer representative may be provided with information for configuring various components in the customer network 106. For example, an appropriate customer representative might be provided with information for configuring the router 114 or the router 134 to route data between the VLANs 124A and 124B. The customer may then utilize this information to configure various network devices within the customer network 106. Once the customer has completed configuration of the customer network 106 for testing, the testing of the connection between the customer network 106 and the service provider network 102 may begin.

From operation 410, the routine 400 proceeds to operation 410, where the network test component 120 determines whether a request to begin testing the direct network-to-network connection 110 has been received. For example, after submission of the test parameters 130, a user might request that the test of the direct network-to-network connection 110 be started. If such a request is received, the routine 400 proceeds from operation 412 to operation 420, described below. If a request to begin testing is not received, the routine 400 proceeds from operation 412 to operation 414.

At operation 414, the network test component 120 determines whether a preset time has elapsed since the resources 104A and 104B were provisioned in the service provider network 102 and/or since the customer was provided parameters for use in configuring components within the customer network 106. If the preset period of time has not elapsed, the routine 400 proceeds back to operation 412, where another determination is made as to whether a request to start testing has been received.

If, at operation 414, the network test component 120 determines that the preset period of time has elapsed, the routine 400 proceeds from operation 414 to operation 416. At operation 416, the network test component 120 may cause the resources 104A and 104B provisioned at operation 408 to be de-provisioned. The customer might also be provided notice that the resources 104A and 104B have been de-provisioned. The routine 400 then proceeds from operation 416 to operation 418, where it ends.

At operation 420, the test data 126 is transmitted from the resource 104A to the resource 104B in the manner described above. For example, the virtual machine instance 202A in the VPC 204A might transmit the test data 126, which is routed through the service provider endpoint router 112 and over the VLAN 124A to the customer side router 114. The customer side router 114 then routes the test data 126 onto the second VLAN 124B and to the service provider endpoint router 112. The service provider endpoint router 112 and, potentially other components in the service provider network 102, then cause the test data 126 to be routed to the virtual machine instance 202B in the VPC 204B. In other embodiments, a virtual machine instance 202A in a VPC 204A might transmit test data 126 to a publically accessible resource 302 in a similar fashion.

From operation 420, the routine 400 proceeds to operation 422, where a determination is made as to whether the testing process described above has been completed. The testing process may be completed if the testing specified by the test parameters 130 has been completed or if the test fails. If testing is not complete, the routine 400 proceeds back to operation 420 where testing might proceed in the manner described above. If testing has completed, the routine 400 proceeds from operation 422 to operation 424.

At operation 424, the test results 128 are generated and provided to the user that submitted the test request 118. As mentioned above, the test results 128 might include metrics including, but not limited to, whether the test described above was successful or unsuccessful, the throughput and/or latency of the direct network-to-network connection 110, and/or any other type of metric that describes the availability and/or performance of a network link. The test results 128 might be provided to the individual that submitted the test request 118, such as a customer representative or an administrator of the service provider network 102.

From operation 424, the routine 400 proceeds to operation 426, where the resources 104A and 104B in the service provider network 102 utilized to perform the testing of the direct network-to-network connection 110 may be de-provisioned in an automated fashion and without human intervention. For example, the network test component 120 might instruct the provisioning component 122, or one or more other components in the service provider network 102, to de-provision the virtual machine instances 202A and 202B, the VPCs 204A and 204B, and the VLANs 124A and 124B. Once the resources 104 utilized to perform the testing have been de-provisioned, the routine 400 proceeds from operation 426 to operation 428, where it ends.

Figure 5:
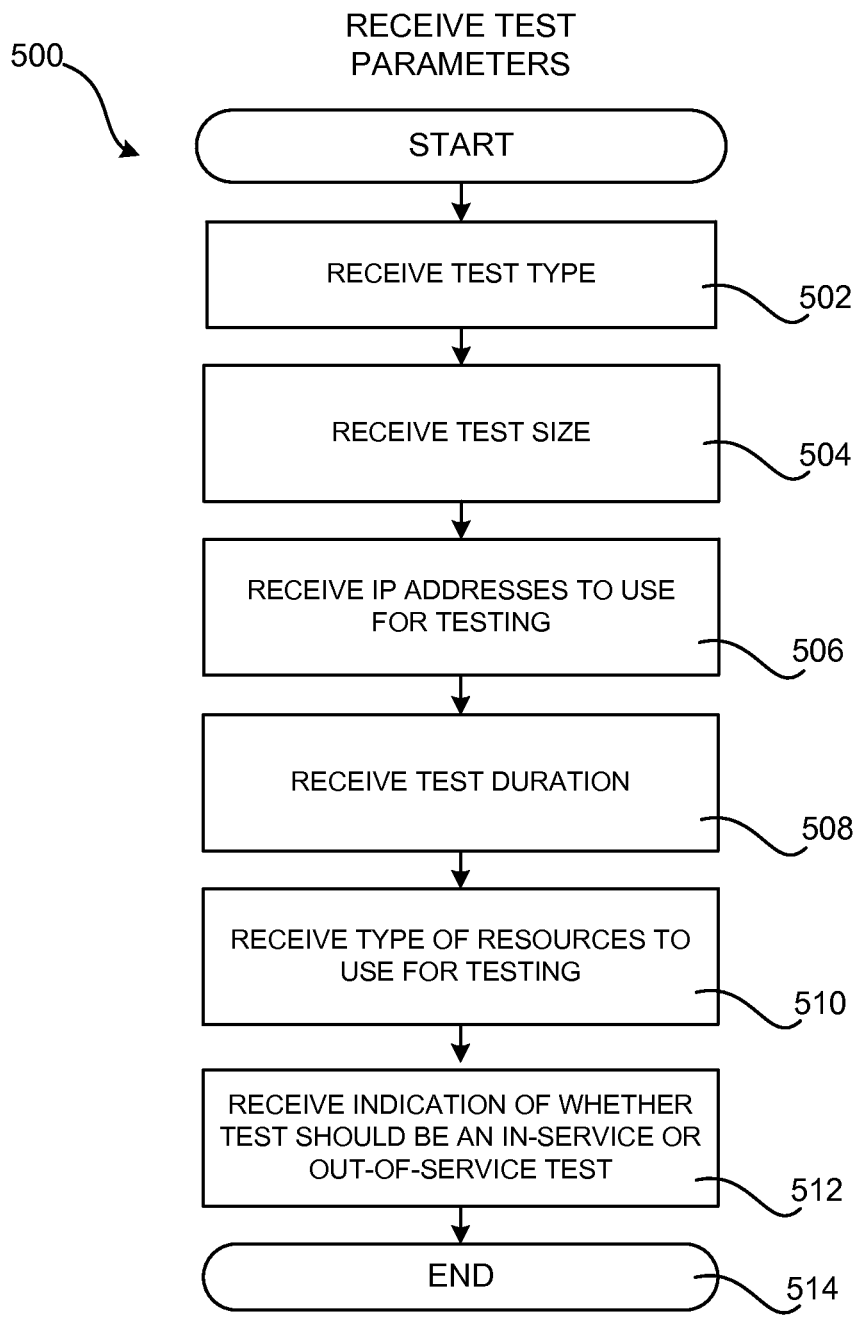
FIG. 5 is a flow diagram showing one illustrative routine for receiving test parameters for use in testing a direct network-to-network connection using resources provided by a service provider network.

FIG. 5 is a flow diagram showing one illustrative routine 500 for receiving test parameters 130 for use in testing a direct network-to-network connection 110 using resources 104 provided by the service provider network 102. As mentioned briefly above, the test parameters 130 may be submitted with a test request 118 in one embodiment. Additionally, the test parameters 130 might be submitted by way of an appropriate graphical user interface, through an API, or in another manner.

The routine 500 begins at operation 502, where a test type is received. The test type specifies the type of test to be performed on the direct network-to-network connection 110. For example, the test type might specify that a ping test, IPERF test, or other type of test be performed on the direct network-to-network connection 110. Other test types might also be specified in other embodiments.

From operation 502, the routine 500 proceeds to operation 504, where a test size may be received. The test size might specify the amount of data that is to be written from the resource 104A to the resource 104B. Alternately, the test size might specify the amount of data that is to be read from the resource 104B. For example, if the resource 104B is a publically accessible data storage resource, the test size might specify a number of megabytes of data that are to be read from the data storage resource in order to test the direct network-to-network connection 110.

From operation 504, the routine 500 proceeds to operation 506, where the internet protocol ("IP") addresses to be utilized to test the direct network-to-network connection 110 may be specified. For example, the IP addresses utilized by the VPCs 204A and 204B might be specified. Similarly, the IP addresses utilized by the virtual machine instances 202A and 202B might also be specified at operation 506.

From operation 506, the routine 500 proceeds to operation 508, where a test duration may be specified. The test duration specifies the amount of time that the test data 126 should be transmitted over the direct network-to-network connection 110 in the manner described above. For example, in conjunction with operation 504, a user might specify that 20 mb/s of data be transmitted over the direct network-to-network connection 110 for sixty seconds. In this manner, a user can specify both the volume of data to be transmitted and the duration of the transmission.

From operation 508, the routine 500 proceeds to operation 510, where the type of resources 104 to be utilized to test the direct network-to-network connection 110 might be specified. For example, a user might be permitted to specify whether publically accessible or private resources 104 be utilized, and the particular types of resources 104 to be utilized in the testing of the direct network-to-network connection 110. Some of the various types of resources 104 that might be utilized have been described above.

From operation 510, the routine 500 proceeds to operation 512, where a user might be permitted to specify whether the test of the direct network-to-network connection 110 is an in-service test, where other data on the direct network-to-network connection 110 is not disturbed, or an out-of-service test wherein no other data is permitted on the direct network-to-network connection 110. In this regard, if an in-service test is selected, the user might also be permitted to specify what portion of the available bandwidth on the direct network-to-network connection 110 be utilized for testing. A network-to-network interface ("NNI") or other mechanism might be utilized to enforce a restriction on the volume of data transmitted over the direct network-to-network connection 110 during testing. From operation 512, the routine 500 proceeds to operation 514, where it ends.

It should be appreciated that the various test parameters 130 described above with regard to FIG. 5 are merely illustrative. Other test parameters 130 not specifically described above might also be utilized in other embodiments. Additionally, it should be appreciated that the test parameters 130 might be utilized to provision and configure resources 104 in the service provider network 102 prior to the start of testing. The test parameters 102 might also be utilized during testing of the direct network-to-network connection 110.

Figure 6:
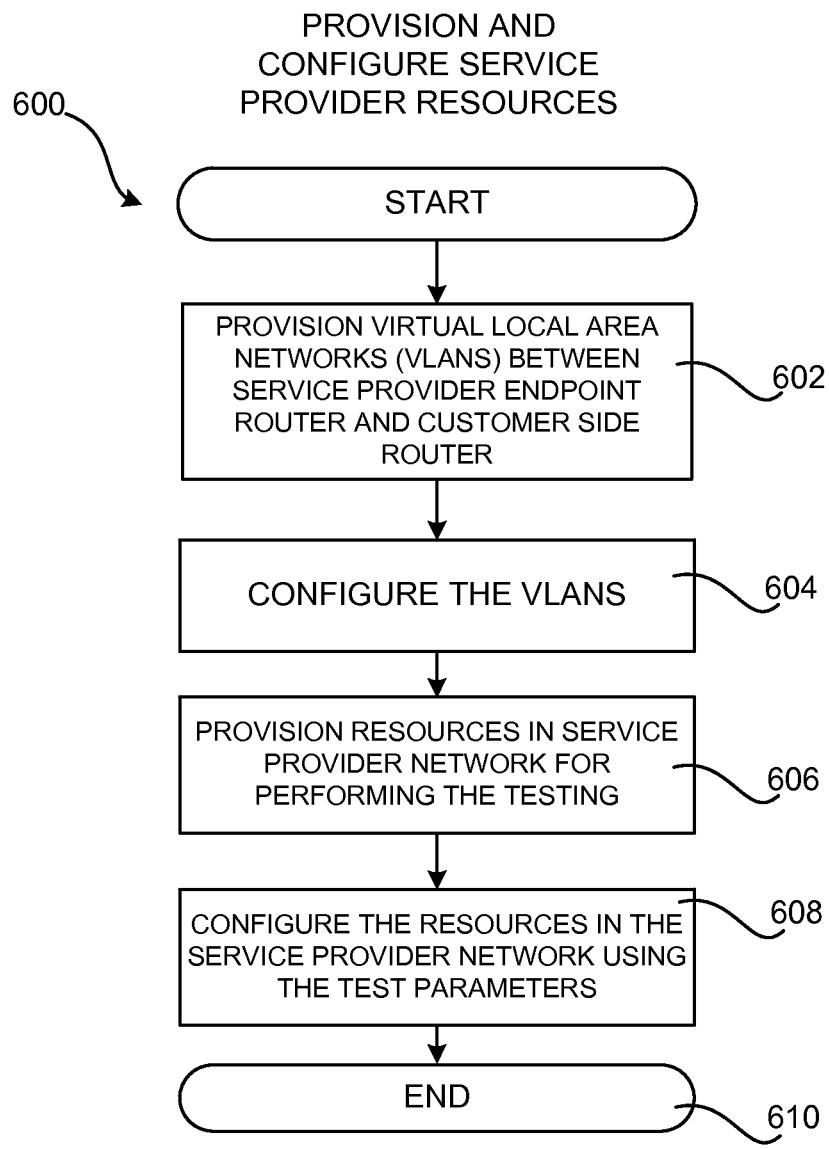
FIG. 6 is a flow diagram showing one illustrative routine for configuring and provisioning resources for use in testing a direct network-to-network connection.

FIG. 6 is a flow diagram showing one illustrative routine 600 for configuring and provisioning resources 104 for use in testing a direct network-to-network connection 110, according to one embodiment disclosed herein. As discussed above, the provisioning component 122 and/or other components in the service provider network 102 might be configured to receive requests to provision new instances of resources 104, such as instances of virtual machines. The provisioning component 122 and/or other components in the service provider network 102 might also be configured to receive requests to de-provision existing instances of resources 104. For example, the network test component 120 might instruct the provisioning component 122 to create the VPCs 204A and 204B and/or the virtual machine instances 202A and 202B for use in testing the direct network-to-network connection 110. Once the testing has completed, the network test component 120 might instruct the provisioning component 122 to de-provision the VPCs 204A and 204B and/or the virtual machine instances 202A and 202B. The routine 600 illustrates additional details regarding the provisioning process.

The routine 600 begins at operation 602, where the provisioning component 122, or another component within the service provider network 102, configures the VLANs 124A and 124B. As discussed above, the VLANs are provisioned on the direct network-to-network connection 110 between the service provider endpoint router 112 and the customer side router 124A in one embodiment. As mentioned above, the VLANs 124A and 124B might be provisioned between the service provider endpoint router 112 and virtually any router within the customer network 106. By performing tests using VLANs 124A and 124B configured between the service provider endpoint router 112 and different routers at different locations within the customer network 106, different aspects of the network connection between the service provider network 102 and the customer network 106 might be tested.

Once the VLANs 124A and 124B have been provisioned, the routine 600 proceeds from operation 602 to operation 604, where the VLANs 124A and 124B are configured. The test parameters 130 described above might be utilized to configure the VLANs 124A and 124B. From operation 604, the routine 600 proceeds to operation 606.

At operation 606, the provisioning component 122, or another component within the service provider network 120, provisions the resources 104A and 104B for use in testing the direct network-to-network connection 110. For example, the provisioning component 122 might provision the VPCs 204A and 204B and/or the virtual machine instances 202A and 202B. The routine 600 then proceeds to operation 608, where the resources 104 are configured. For example, the test parameters 130 described above might be utilized to configure the resources 104 for testing the direct network-to-network connection 110 in the manner specified by the test parameters 130.

It should be appreciated that the provisioning and configuration operations described above with regard to FIG. 6 are merely illustrative and that other provisioning and configuration operations might be performed in order to test the direct network-to-network connection 110 in the manner described above. From operation 608, the routine 600 proceeds to operation 610, where it ends.

Figure 7:
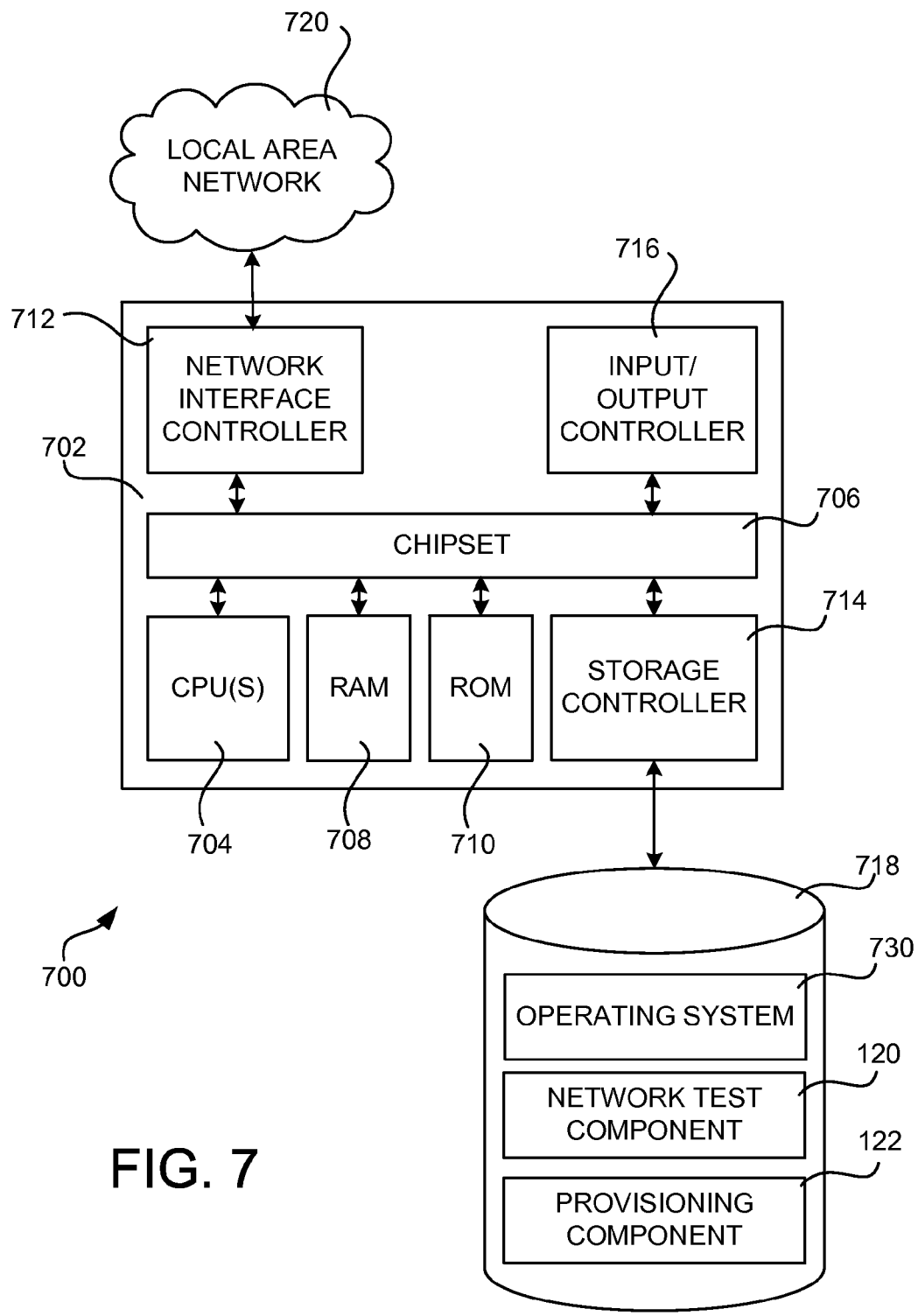
FIG. 7 is a computer architecture diagram showing an illustrative computer hardware architecture for implementing a computing device that might be utilized to implement aspects of the various embodiments presented herein.

FIG. 7 shows an example computer architecture for a computer 700 capable of executing the program components described above for testing a direct network-to-network connection 110 using resources 104 provided by a service provider network 102. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 7 may be utilized to execute the network test component 120 and/or the provisioning component 122 shown in FIG. 1A and described above.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 720. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700, such as the network test component 120, the provisioning component 122, and/or any of the other software components and data described above. The mass storage device 718 might also store other programs and data not specifically identified herein.

In one embodiment, the mass storage device 718 or other computer-readable storage media is encoded with computer-executable instructions which, when loaded into the computer 700, transforms the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various routines described above with regard to FIGS. 4, 5 and 6. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for testing a direct network-to-network connection 110 using resources 104 provided by a service provider network 102 have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
provision a first resource within a service provider network;
provision a second resource within the service provider network, the second resource different than the first resource;
configure a network connection between the service provider network and a customer network such that data transmitted from the first resource to the second resource is transmitted through at least a portion of the customer network;
perform a test of the network connection between the service provider network and the customer network by transmitting test data from the first resource within the service provider network to the second resource within the service provider network by way of at least the portion of the customer network;
generate one or more metrics describing a status of the network connection between the service provider network and the customer network based upon the transmission of the test data; and
de-provision the first resource and the second resource following a completion of the test of the network connection.

2. The non-transitory computer-readable storage medium of claim 1, wherein at least one of the first and second resources is a publically accessible resource within the service provider network.

3. The non-transitory computer-readable storage medium of claim 1, wherein the test data comprises a request to write data from the first resource within the service provider network to the second resource within the service provider network.

4. The non-transitory computer-readable storage medium of claim 1, wherein the test data comprises a request to read data from the second resource within the service provider network.

5. The non-transitory computer-readable storage medium of claim 1, wherein configure a network connection between the service provider network and a customer network such that data transmitted from the first resource to the second resource is transmitted through at least a portion of the customer network comprises:
configuring a first virtual local area network (VLAN) on the network connection for use in routing the test data from the first resource within the service provider network to the customer network; and
configuring a second VLAN on the network connection for use in routing the test data from the customer network to the second resource within the service provider network.

6. The non-transitory computer-readable storage medium of claim 1, wherein the first resource is located within a first virtual private cloud (VPC) in the service provider network.

7. The non-transitory computer-readable storage medium of claim 6, wherein the second resource is located within a second VPC in the service provider network.

8. The non-transitory computer-readable storage medium of claim 7, wherein at least one of the first and second resources comprises a virtual machine instance.

9. The non-transitory computer-readable storage medium of claim 1, having further computer-executable instructions stored thereupon to expose an application programming interface (API) for receiving a test request, and wherein the test of the network connection between the service provider network and the customer network is performed responsive to receiving a test request by way of the API.

10. A system for testing a network connection between a customer network and a service provider network, the system comprising:
one or more computing systems configured to execute a network test component, the network test component configured to receive a request to test the network connection and, in response to receiving the request, to
cause a first resource to be provisioned in the service provider network,
cause a second resource to be provisioned in the service provider network, the second resource different than the first resource,
configure a network connection between the service provider network and a customer network such that data transmitted from the first resource to the second resource is transmitted through at least a portion of the customer network, perform a test of the network connection between the service provider network and the customer network by transmitting test data from the first resource within the service provider network to the second resource in the service provider network by at least the portion of the customer network, generate one or more metrics describing a status of the network connection between the service provider network and the customer network based upon the transmission of the test data, and de-provision the first resource and the second resource following a completion of the test of the network connection.

11. The system of claim 9, wherein the first resource is provisioned in a first virtual private cloud (VPC) in the service provider network, and wherein the second resource is provisioned in a second VPC in the service provider network.

12. The system of claim 9, wherein at least one of the first and second resources comprises a virtual machine instance.

13. The system of claim 9, wherein at least one of the first and second resources is a resource that is publically accessible by way of the service provider network.

14. The system of claim 9, wherein configure a network connection between the service provider network and the customer network such that data transmitted from the first resource to the second resource is transmitted through at least a portion of the customer network comprises:

configuring a first virtual local area network (VLAN) on the network connection for use in transmitting the data from the first resource within the service provider network to a device on the customer network; and configuring a second VLAN on the network connection for use in transmitting the data from the device on the customer network to the second resource within the service provider network.

15. The system of claim 10, wherein the network test component is further configured to expose an application programming interface (API) for receiving the request to test the network connection.

16. A computer-implemented method for testing a network connection, the method comprising performing computer-implemented operations for:

provisioning a first resource in a service provider network;

provisioning a second resource in the service provider network, the second resource different than the first resource;

configuring a network connection between the service provider network and a customer network such that data transmitted from the first resource to the second resource is routed through at least a portion of the customer network;

performing a test of the network connection between the service provider network and the customer network by transmitting test data from the first resource to the second resource through the at least a portion of the customer network;

generating one or more metrics describing a status of the network connection between the service provider network and the customer network based upon the transmission of the test data; and de-provisioning the first resource and the second resource following a completion of the test of the network connection.

17. The computer-implemented method of claim 16, wherein at least one of the first and second resources is a resource located in a virtual private cloud (VPC) in the service provider network.

18. The computer-implemented method of claim 16, wherein at least one of the first and second resources is a computing resource that is publically accessible by way of the service provider network.

19. The computer-implemented method of claim 16, further comprising exposing an application programming interface (API) for receiving a test request, and wherein the test of the network connection between the service provider network and the customer network is performed responsive to receiving a test request by way of the API.

20. The computer-implemented method of claim 19, wherein the API is further configured to receive one or more test parameters for use in performing the test of the network connection, the test parameters comprising data defining one or more of a type of test to be performed, a test size, one or more internet protocol (IP) addresses to be used for performing the test, a test duration, a type of the first resource, or a type of the second resource.

\* \* \* \* \*